Dec. 5, 1967     C. R. KLEIN     3,356,239
CARRIER VEHICLE

Filed Dec. 29, 1965     2 Sheets-Sheet 1

INVENTOR.
CARL ROBERT KLEIN
BY Bosworth, Sessions
Henstrom & Knowles
ATTORNEYS

Dec. 5, 1967

C. R. KLEIN 3,356,239

CARRIER VEHICLE

Filed Dec. 29, 1965

INVENTOR.
CARL ROBERT KLEIN
BY Bosworth, Sessions
Herrstrom & Knobbs
ATTORNEYS

United States Patent Office 3,356,239
Patented Dec. 5, 1967

3,356,239
CARRIER VEHICLE
Carl Robert Klein, 403 Northwest St.,
Bellevue, Ohio 44811
Filed Dec. 29, 1965, Ser. No. 517,301
9 Claims. (Cl. 214—390)

This invention relates to a vehicle or conveyance for handling and moving large, heavy, and especially, bulky loads. In particular, this invention relates to a straddle-type conveyance or carrier; i.e., a carrier adapted to be positioned laterally astride the load to be handled, to lift the load clear of the ground, to move the load to another location, to lower the load to the ground, and to be withdrawn from its laterally astride position with respect to the load.

There are many applications for such a carrier or conveyance. The invention is disclosed below in the embodiment of a carrier for moving and handling boats of substantial size in and around storage, repair, and display areas of a boatyard and for use in connection with equipment for hauling or removing boats from the water or launching them into the water. The embodiment disclosed below or other embodiments of the invention find application in places other than boatyards, and involve tasks other than moving and handling boats. Other embodiments of the invention can be used, for example, in lumberyards, warehouses, or storage facilities where large, heavy, and bulky loads are moved and spotted for storage.

This invention, and particularly the embodiment shown and described below, takes cognizance of the increased number and use of pleasure boats in recent years. By past standards, an unusually large number of sailboats and powerboats of substantial size, for example, twenty to forty feet, have been made lately and are being used by people for pleasure and recreation. There has been a corresponding increase in the boatyard business involving hauling boats out of the water and handling, storing, and repairing them on land before they are again launched. The relative bulk and weight of such boats makes them somewhat awkward to handle on land, requires substantial ground space for their storage and large openings in buildings into or from which they need to be moved for repair or display, for example.

Typical of known carriers or conveyances for handling and moving large, bulky loads are carriers which span the load and include a framework positioned and supported above and over the load on long, downwardly extending legs standing on opposite sides of the load. Slings are normally passed downward under the load from this framework high above the ground and over the top of the load. Such devices are cumbersome; they require extra spacing between loads stored adjacent each other to permit the legs on the sides of the vehicle to pass between the adjacently located loads, thereby increasing the total area required to store a given number of loads; they require door openings in buildings into and out of which loads are to be moved which are large enough to accept the overall dimensions of the carrier vehicle standing over the load and are greatly in excess of the overall dimensions of the load itself; and are otherwise awkward, necessarily expensive, and not always easy to operate alone or even with helpers.

The principal object of this invention is to provide a vehicle or conveyance for lifting, lowering, handling, or conveying heavy and large or bulky loads and which requires little more, if not less, extra space, laterally and vertically, than the overall dimensions of the load being handled; a vehicle that is relatively inexpensive and easy, simple, and economical to operate and use by even a single operator; a vehicle that is flexible and adaptable for use with conventional hauling and launching equipment; and a vehicle that is especially able to be moved about, with or without its load, by conventional tractors and/or trucks. In addition, the lifting and lowering functions of such a conveyance are easily accomplished by self-contained electrohydraulic power means.

Briefly, this invention comprises a generally U-shaped structure having a pair of long, horizontal side members positioned and joined together laterally opposite each other by a rigid cross member connecting them together at one end. The U-shaped frame thus formed is supported on wheels for moving it about. The vehicle is positioned with respect to the load to be handled by moving it generally in the direction of the length of the side members and with the open end of the U-shaped structure forward so that the long horizontal side members may be easily positioned laterally astride or on opposite sides of the load. The supporting wheel assemblies and rigid interconnecting cross member are connected and otherwise related to the two horizontal side members at fixed points on and along their lengths, but in a manner permitting the side members to rotate about their axes relative to the wheel assemblies and cross member. Hangers are provided for removable connection and rotation with the side members at any desired point along the length of the side members and for thereby lifting and lowering any load attached to them. Thus, the side members comprise major structural elements of the vehicle and act as beams to support and carry the load. They also are major components in the operating mechanism of the vehicle and serve as torque transmitting shafts to lower and lift the load.

Other features and advantages of this invention, as well as the foregoing objects, will be apparent from the following description taken together with the accompanying drawings in which.

Figure 2:
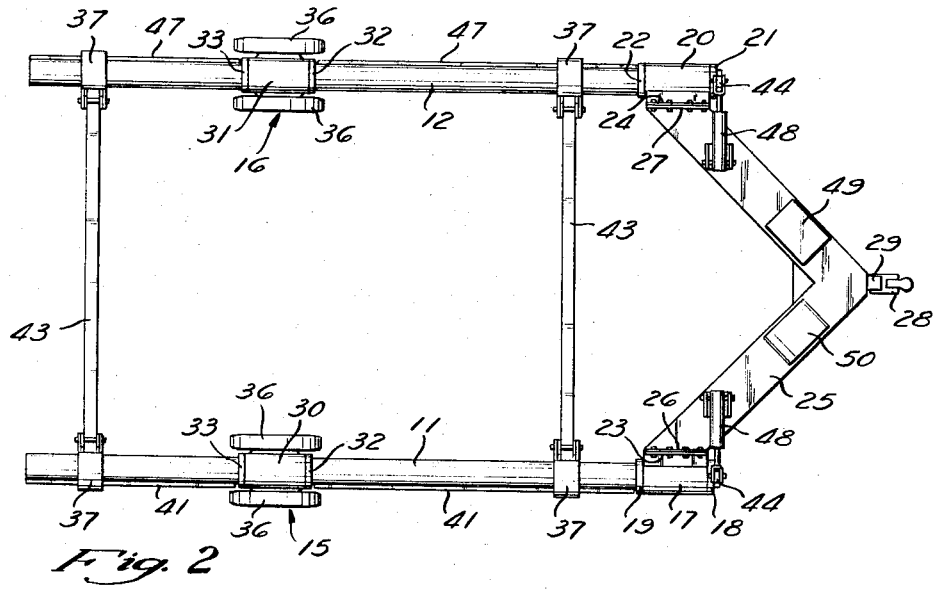
FIGURE 2 is a top elevation view of the embodiment shown in FIGURE 1.

As seen particularly in FIGURE 2, the embodiment of this invention intended for use in handling boats has a main structure of generally U-shaped configuration comprising a pair of longitudinally extending, laterally spaced apart, and preferably parallel supporting side members 11 and 12 forming the side legs of a U. Rigid structural cross member of yoke 25 extends between and joins the side members 11 and 12 at one end as shown. In addition, side members 11 and 12 are provided with wheel assemblies 15 and 16, respectively, mounted on them and supporting them at points remote from their ends and acting together and with the U-shaped structure made up of members 11, 12, and 25 to provide the general effect of a single-axle trailer adapted to be pulled by attachment at the midpoint of cross member or yoke 25.

As shown in the drawings, side members 11 and 12 preferably comprise longitudinally extending tubes or pipes of appreciable diameter and having substantial strength as beams for supporting downwardly applied loads in all or throughout a range of positions of rotation about their longitudinal axes. The tubes comprising side members 11 and 12 are also able to transmit substantial torques applied, for example, to one end of them. As will become clear from the description of the apparatus below, tubes of circular cross section serve well and are preferred, though other shapes or sections which may be rotated without encountering positions of weakness as a beam and torque transmitting shaft may be used and are comprehended by this invention.

One end of side member 11 is journalled in a forward journal bearing 17. Forward bearing 17 comprises a generally cylindrical housing and telescopingly receives a length of the forward or journal portion of side member 11. Side member 11 is free to rotate about its axis within bearing 17. Conventional roller bearings are preferably provided within the cylindrical housing to reduce the friction between journal bearing 17 and tubular side member 11. Relative axial movement of forward bearing 17 on or along side member 11 is prevented by suitable means such as front and rear thrust collars 18 and 19, respectively, bolted or otherwise suitably fastened to side member 11 closely adjacent the forward and rearward ends, respectively, of bearing 17.

Side member 12 is also journalled in a forward bearing 20 similar to forward bearing 17 described above. Forward bearing 20 telescopingly receives one end of side member 12 and permits its relative rotation therein. Axial movement of forward bearing 20 relative to side member 12 is prevented by front and rear thrust collars 21 and 22, respectively, bolted to side member 12.

Forward bearings 17 and 20, associated with the two side members, are each provided with box-mounted bolting flanges 23 and 24, respectively. A rigid cross member or yoke 25 extends between and interconnects forward bearings 17 and 20. Yoke 25 is preferably of a generally V shape and formed of beams having a box or similar section. The spaced apart ends of V-shaped yoke 25 are provided with bolting flanges 26 and 27 adapted to mate with and be bolted to bolting flanges 23 and 24, respectively, on the forward bearings. The relationship of forward bearings 17 and 20, as fixed by their connection to yoke 25, is such that their axes are substantially parallel so that the bearings position and maintain side members 11 and 12 in the laterally spaced apart and parallel arrangement shown. A trailer hitch 28 is conveniently mounted at the apex of the V-shaped yoke 25. The hitch is preferably adjustable in height as may be arranged, for example, by a vertical stub post 29 provided with a plurality of trailer hitch mounting holes.

Separate and independent wheel assemblies 15 and 16 are mounted on and journal side members 11 and 12, respectively, at generally laterally opposite points along their length by means of journal bearings 30 and 31, respectively. Wheel assembly bearings 30 and 31, including their generally cylindrical housings, are similar to forward journal bearings 17 and 20. Bearings 30 and 31 of the wheel assemblies permit rotation of their respectively journalled and telescopingly received side member. Bearings 30 and 31, and thus their respective wheel assemblies 15 and 16, are restrained against axial movement on and along the side members journalled in them by front and rear thrust collars 32 and 33, respectively, bolted or otherwise fastened to side members close to the end of each bearing 30 and 31. Short, double-ended axles 34 and 35 are included in wheel assemblies 15 and 16 and, preferably, are suitably attached to the underside of journal bearings 30 and 31, respectively. Each wheel assembly 15 and 16 is provided with a pair of wheels, mounted and spaced apart on a common axle to give stable support to the assembly and the side members during their rotation.

As shown in the drawings, two side members 11 and 12, yoke 25 interconnecting their forward ends and holding them in the laterally and spaced apart parallel relationship shown, and wheel assemblies 15 and 16, together, comprise what is, in effect, a trailer-like vehicle having a discontinuous, single axle supporting a U-shaped framework open at one end and closed by the yoke at or near its other end.

In addition to the generally trailer-like aspect of the structure described above, the invention comprehends operative means for lifting and lowering loads from and to the ground between side members 11 and 12 and carrying and moving loads about on wheel assemblies 15 and 16. The means for lifting and lowering the loads preferably includes four similar hangers 37 shown in FIGURES 1 and 2 as located generally near the ends of the two side members 11 and 12. A hanger 37 is clearly shown in detail in the enlarged scale side elevation views of FIGURES 3 and 4. As seen especially in FIGURES 3 and 4, hangers 37 have a generally semicircular portion 38 adapted to overlie and preferably to extend a little more than half the circumference of the tubes comprising the side members. A short radial arm 39 extends from each semicircular portion 38. One end of semicircular portion 38 is formed as a hook 40 to engage a longitudinally extending cleat 41 suitably fastened to side members 11 or 12. Both side members 11 and 12 are provided with cleats 41 attached to them along their normally oppositely facing outer sides and extending between the forward journal bearings and the wheel assembly journal bearings journalling them and also rearwardly of the wheel assemblies.

Figure 1:
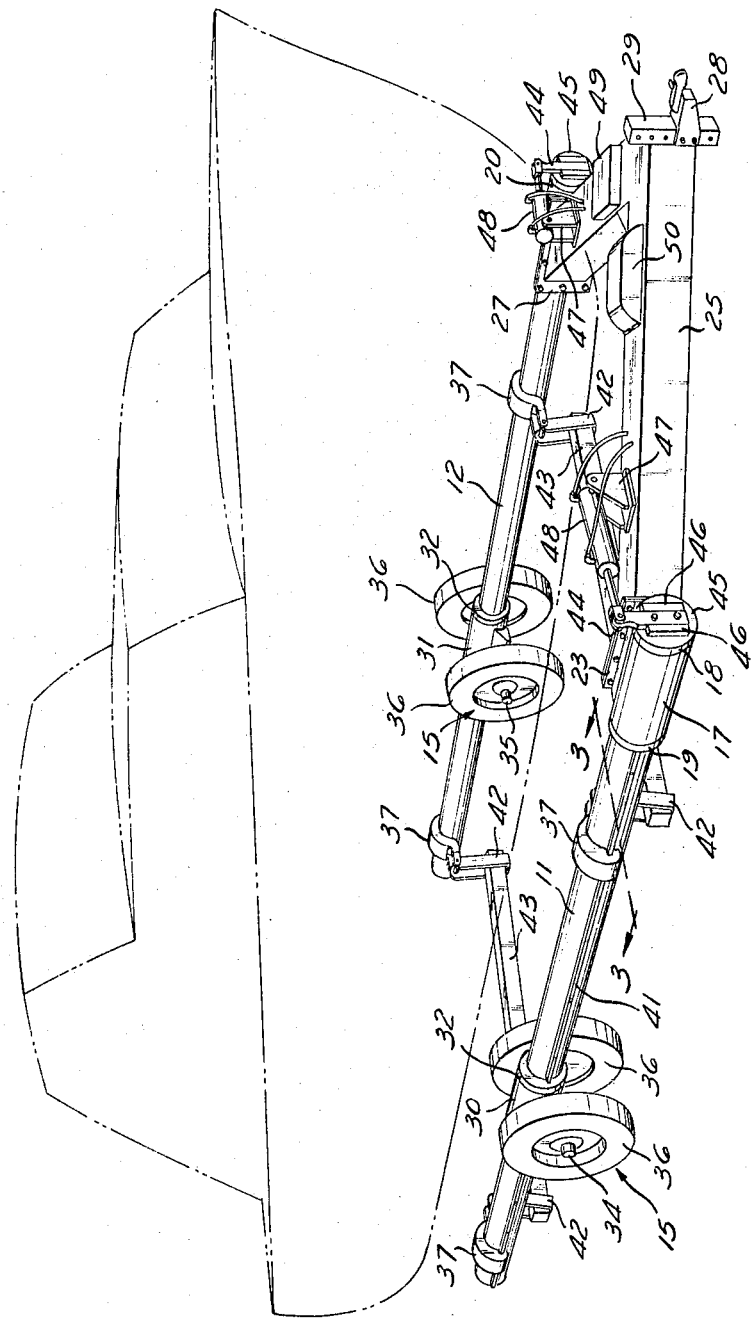
FIGURE 1 is a perspective view of an embodiment of this invention preferred for use in connection with the handling of boats such as the powercraft shown in phantom outline.
Figure 3:
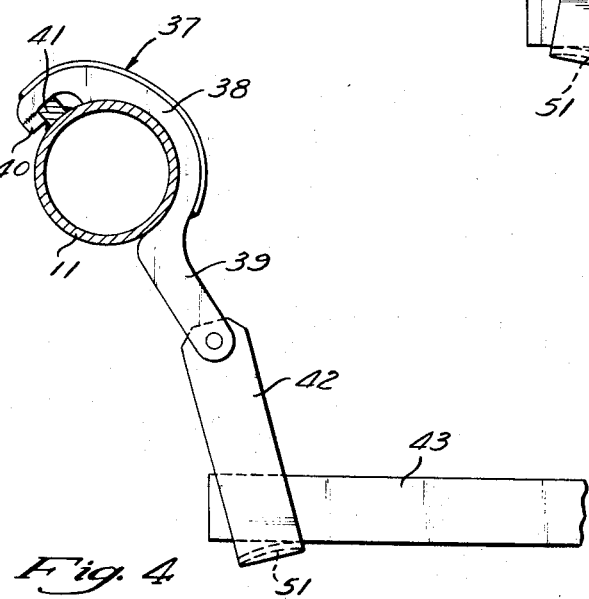
FIGURES 3 and 4 are side elevation views taken in the plane of line 3—3 of FIGURE 1 showing parts of the trailer in detail and in enlarged scale and together illustrating different operative positions of parts of the device.
Figure 4:
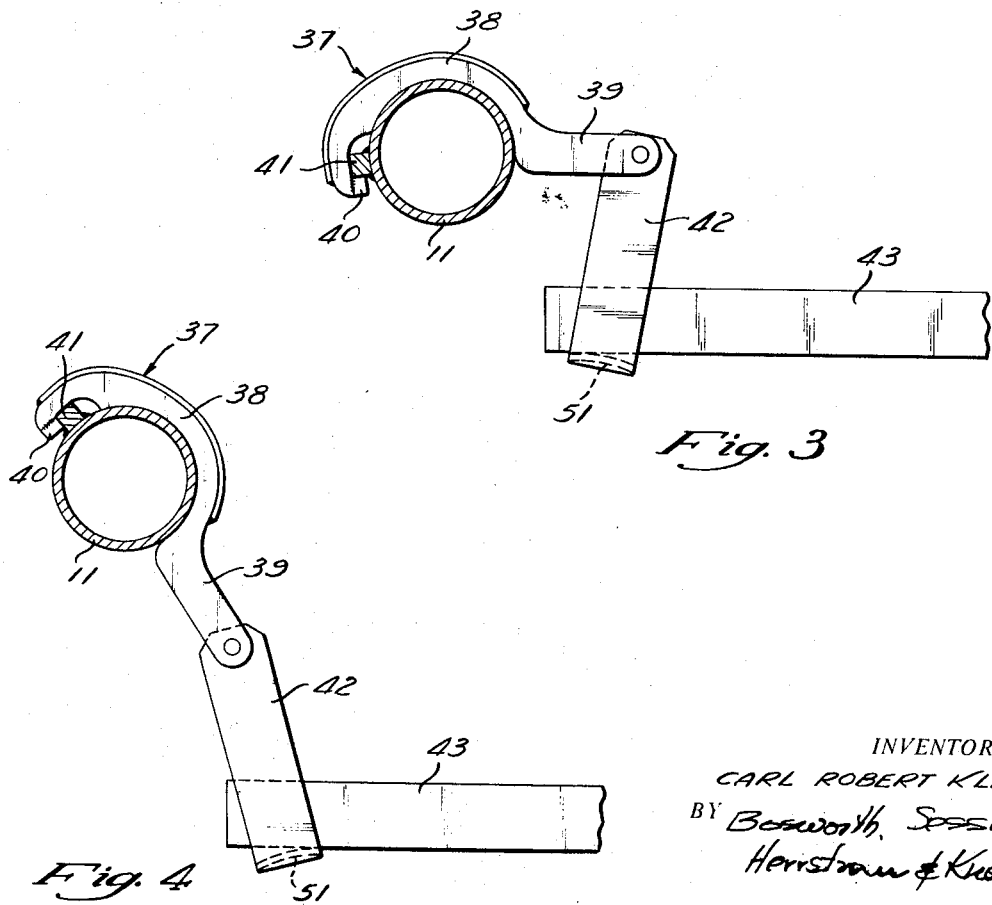

Hangers 37 are used by placing them on and over the top of a side member with hook 40 engaging a cleat 41 in the manner shown in FIGURES 3 and 4 and with short radial arm 39 directed toward the other side member. Hangers 37 are easily removed and replaced at selected locations along side members 11 and 12 as may be required to handle various sizes of loads. A stirrup 42 is attached by and hangs from a pivotal connection at the outer end of the radial arm 39 of each hanger 37. With the hangers 37 arranged as shown in FIGURES 1 and 2, all the stirrups hang down toward the ground and between the two side members 11 and 12. A crossbeam 43 extends between and is conveniently received and supported by each pair of stirrups 42 depending from a pair of hangers located at generally laterally opposite points on side members 11 and 12.

From the foregoing, it will be apparent that a pair of hangers 37 and their associated stirrups 42 mounted at laterally opposite points on spaced apart side members 11 and 12, together with a crossbeam spanning the distance between and supported in the stirrups, will support a load able to be positioned on the crossbeam. Also, the crossbeam and a load so supported can be raised and lowered if the tubes comprising side members 11 and 12 and to which the hangers hooked by means of cleats are rotated about their axes in opposite directions. FIGURES 3 and 4 show a single hanger 37, its associated stirrup 42, and one end of the crossbeam 43 supported thereon, all as mounted on a side member 11 or 12 and shown in two of its operating positions. FIGURE 3, for example, shows the side member 11 rotated to support crossbeam 43 in a raised position and FIGURE 4 shows the corresponding mechanism with the crossbeam 43 in a lowered position. It will be noted that the horizontal portion or footpiece 51 of stirrup 42 shown in dotted outline in FIGURES 3 and 4 is preferably arcuately formed to provide a surface having large-radius rolling contact with the underside of crossbeam 43. This permits stirrup 42 to assume smoothly the various angular relationships which it has with crossbeam 43 during its operation between the raised and lowered positions. Obviously, it is important in handling heavy and/or bulky loads, such as large boats and their cradles, that movements of the lifting and lowering mechanism supporting the load be as smooth and as free of abrupt motions as possible.

Of course, more than one set of hangers 37 and a single cooperating cross beam 43 may be, and generally is, employed to accommodate a load. Also, whether one or more crossbeams and related hangers are employed, it or they can be positioned at selected positions along the length of side members 11 and 12 when, as preferred, cleats 41 attached to the side members extend substantially continuously along the lengths of the side members.

As will be understood from FIGURE 1, a large and bulky load, such as a boat shown there in phantom outline, may be handled together with its cradle, for example, by a pair of crossbeams 43 extending between side members 11 and 12. The crossbeams are supported on two pairs of hangers 37 suitably positioned and mounted on the side members and hooked over the cleats 41 at points more or less adjacent the ends of the side members and forward of and rearward of the wheel assemblies 15 and 16. The boat has been shown in phantom outline in FIGURE 1 without its cradle so as not to obscure the structure embodying the invention. It will be readily understood, however, that the cradle may be supported on crossbeams 43 and, in turn, the boat in the cradle. Alternatively, the boat may be blocked and supported directly on suitable crossbeams without a cradle. It will also be noted that the V-shape of yoke 25 is particularly well adapted to loads such as conventional boats as shown because it provides extra length to accommodate the bow portion.

A simple and effective means for rotating side members 11 and 12 in opposite directions about their axes to raise or lower a load supported on a crossbeam or beams extending between them comprises an electrohydraulic system such as indicated in FIGURES 1 and 2. Force is applied through a radial extension 44 to each of side members 11 and 12 at the end thereof received by forward journal bearings 17 and 20, respectively. Such an extension may be conveniently mounted by welding an end plate 45 to the forward end of the tubes making up side members 11 and 12. To each of these end plates 45, the radial extension member 44 is bolted. Additional strength is provided by cheek plates 46 welded to plates 45 on either side of the radial extensions 44.

A cylinder mounting bracket 47 is secured on yoke 25 at a point laterally opposite each radial extension 44. A double-acting hydraulic actuator 48 is pivotally connected at one end to each mounting bracket 47 and at its other end to laterally opposite radial extension 44. It will be seen that rotation of side members 11 and 12 through at least a limited arc and in both directions can be accomplished by the extension and retraction of hydraulic actuators 48.

The power for hydraulic actuators 48 is conveniently provided by an electric motor-driven hydraulic pump operatively connected in a conventional manner in a hydraulic circuit including fluid reservoir directional control and on-off valves and conduits. Greatest convenience and mobility is realized by using a battery-powered electric motor. Preferably then, the complete electrohydraulic system, including the reservoir and battery, is installed in suitable compartments within yoke 25. As indicated in FIGURES 1 and 2, a battery compartment having a cover 49 is located in one side of yoke 25 and an access opening having a hinged lid 50 which may be opened for reaching the hydraulic controls and pump contained therein is located on the other side of yoke 25.

The benefits and advantages to be gained from and enjoyed through the use of embodiments of this invention, and particularly from the embodiment described above and shown in the accompanying drawings, will be further understood from the following description of the operation thereof. As noted above, the apparatus shown in FIGURES 1 and 2 comprises what is effectively a single-axle or two-wheel trailer having a U-shaped frame. The frame comprises a pair of parallel and laterally spaced apart and opposite side members 11 and 12 joined together at one end by a cross member or a yoke 25. As shown, the cross member or yoke is V-shaped and provided with a trailer hitch 28 at its apex. With supporting crossbeams 43 removed from stirrups 42, the structure has a large unobstructed central opening closed at the hitch end and open at the opposite end. Assuming that the load to be moved is a large boat standing on its cradle resting on the ground, the assembly is moved by suitable means such as a truck or tractor attached to hitch 28 into a position with the two side members 11 and 12 lying along and on opposite sides of the cradle supporting the boat. The apparatus is positioned fore and aft with respect to the boat to be lifted so that, when the weight of the boat and its cradle, if used, is resting fully on and supported by the carrier, the desired balance on the wheels and the desired tongue weight is established.

With the carrier vehicle positioned with respect to the load as described above, at least a pair of crossbeams 43 are placed transversely of or athwart the cradle under its main longitudinal and/or lateral structural members. Depending upon the construction of the cradle, it may have to be blocked above the ground to permit the crossbeams 43 to be boxed beneath the proper part of the cradle and/or to accommodate the lowermost position of crossbeams 43.

It will be recognized that the manner in which hangers 37 are mounted on side members 11 and 12 and the ends of crossbeams 43 are supported in stirrups 42 permits rotation of side members 11 and 12 through a limited number of degrees. Thus, for a given length of radial extension 44, the amount of travel between the fully raised and lowered positions is limited by the arc of rotation provided side members 11 and 12. The upper and lower limits of travel with respect to the ground are determined essentially by the length of stirrups 42. A hanger 37 is positioned on side member 11 or 12 adjacent each end of crossbeams 43 crossing beneath the cradle. It will be apparent that wide flexibility in the location of crossbeams 43 to accommodate loads having a wide variety of weight distributions is afforded by the almost continuous and full length of mounting locations provided on side members 11 and 12 for hangers 37. Each end of crossbeams 43 is supportably positioned in its adjacent and associated stirrup 42. This may be easily accomplished by swinging the stirrup 42 about its point of pivotal connection with its radial extension 44, lifting the end of crossbeam 43 up above the level of the footpiece 51 and letting the stirrup 42 swingingly return to its normal position with footpiece 51 underneath the end of the crossbeam.

When all the crossbeams to be used are supported at their ends and beneath the cradle, the hydraulic system mounted in yoke 25 is operated to extend hydraulic actuators 48. As a result, side members 11 and 12 counterrotate or move in opposite directions so that crossbeams 43 are raised as the generally downwardly and inwardly directed radial extensions 44 swing upwardly to a generally inward and horizontal direction. As a consequence of the raising of crossbeams 43, the load comprising the boat and its cradle is lifted. The carrier vehicle with its load is now ready to be moved by a tractor, for example, connected to its hitch 28.

When the carrier vehicle has been positioned at the desired location for its load, the electrohydraulic system is operated to retract both hydraulic actuators 48. As a result, side members 11 and 12 are counterrotated so that radial extensions 44 of hangers 37 swing downwardly, lowering crossbeams 43 and the cradle and boat borne on them to the ground or a blocked-up position above the ground, if appropriate. Stirrups 42 may then be swung upwardly and outwardly and out of supporting engagement with the ends of crossbeams 43; the crossbeams may be removed from beneath the cradle; and, the carrier vehicle may be moved away, leaving the load in its new location.

The carrier vehicle described above and embodying this invention engages its loads at positions close to the ground and has its structure confined to a very low height above the ground relative to the loads it carries. Because of this, the carrier vehicle can be operated beneath overhanging and higher portions of a load such as the top-sides of boats. Thus, the overall lateral dimensions of the carrier vehicle are often less than the beam of the boat which it is carrying. This circumstance permits the carrier vehicle to position and spot boats for winter storage in the yard as close as the yard operator and/or the boat owner wish to have them.

The disclosure above of a particular embodiment of this invention will suggest to those skilled in the art other embodiments as well as modifications of the disclosed embodiment, all of which are comprehended by this invention. For example, as disclosed above, this invention comprehends a carrier vehicle having a generally U-shaped framework supported on two vehicular assemblies or sets of wheels arranged at generally opposite points on each side of the framework to provide what is effectively a single-axle trailer arrangement. The term "single axle" is intended, of course, to comprehend a single set of tandem or multi-axle arrangements. The single-axle arrangement with the hitch provided at the convergent or apex end of the rigid cross member of the framework provides a vehicle having the usual maneuvering characteristics of a single-axle trailer. The characteristic maneuverability of a four-wheel trailer can be imparted to the vehicle by employing two wheel assemblies for supporting each side member. In this event, the forward pairs of wheels adjacent the cross member could be arranged to steer, keeping in mind that the cross-connecting and steering mechanism must be kept clear of the open space within the U-shaped framework so as not to limit the ability of the vehicle to accept a load. In the four-wheel, two-axle arrangement, the vehicle still enjoys the advantages of the single-axle version such as a low profile, the ability to reach along and under overhanging loads, and the general simplicity and economy in manufacturing and operating the vehicle.

The embodiment shown and described above includes a pair of load engaging and supporting means spaced apart longitudinally of the vehicle and each comprising a pair of hangers including their pivotally connected stirrups and a crossbeam extending therebetween and supported thereby. Depending upon the load, more or less of these load engaging and supporting means or assemblies may be employed; and, because they are removably attached to the side members, each may be positioned at selective points on and along the length of the side members at any point where an exteriorly mounted cleat is provided.

It will be apparent to those skilled in the art that other means may be employed than crossbeam 43, for example, and stirrups 42. Depending upon the nature of the load, the load engaging and supporting means could comprise a flexible tension element such as a cable or chain connected to and extending between the outward ends of arm portions 39 of hangers 37. For example, if large cylindrical objects, such as tanks, were to be lifted, carried, and lowered by vehicles embodying this invention, such tension elements might be particularly useful. Hangers 37 could be oriented so that turning side members 11 and 12 through their limited angular range of rotation would move radial arms from a generally horizontal position to an upwardly directed position when the load is to be lifted from the ground and then back again when the load is to be lowered to the ground. It is equally clear that suitable loads could be lifted and conveyed and otherwise handled solely by sets of radially extending arms similar to arms 39 on hangers 37. Such arms could be arranged in laterally opposite pairs on the side members to reach out between the side members and engage the load directly or lugs spotted on it and lift it and support it during transit of the carrier. In such an embodiment as in that one shown and described above, the side members are operative to lift and lower the load as well as at all times supporting the load in the nature of a static structural member.

Those skilled in the art will appreciate that various changes and modifications can be made in the apparatus described herein without departing from the spirit and scope of the invention.

I claim:
1. A carrier vehicle comprising
   a generally U-shaped framework having a pair of longitudinally extending side members connected together and held in a generally laterally opposite and spaced apart relationship with their axes in substantially the same plane by a rigid cross member extending transversely between them and joined to each of them by one of a pair of bearing means, each of said pair of bearing means being fixedly attached to said cross member and engaging and journalling one of said side members for giving and maintaining position and direction to its axis relative to said cross member and the other of said side members while permitting and providing for rotation of the engaged side member about its axis so positioned,
   operating means for rotating said members about their axes,
   vehicular assemblies engaging and supporting said side members for providing moving support to said U-shaped framework, said vehicular assemblies including bearing means for journalling said engaged side members for rotation about their axes and relative to said assemblies,
   load engaging and supporting means extending from and acting between said side members for engagement of loads therebetween and removably attached to and operatively supported by said side members at selected points on and along their lengths, whereby said side members operatively raise and lower said load engaging and supporting means and any load engaged thereby through rotation oppositely in one and the other directions, respectively, and all the while support said load engaging and supporting means and any load thereon.

2. The vehicle of claim 1 in which said cross member is generally V-shaped in approximately the plane of said side members and is joined to said side members adjacent one end thereof with said cross member converging away therefrom.

3. The vehicle of claim 2 in which each side member is supported by one of said vehicular assemblies and said cross member is provided with hitching means mounted thereon generally at a point of convergence thereof.

4. The vehicle of claim 3 in which a pair of load engaging and supporting means extend between and are removably attached to said side members at selected pairs of points spaced apart along the length of said side members and on opposite sides of said vehicular assemblies supporting said side members.

5. The vehicle of claim 1 in which said operating means comprises a double-acting hydraulic actuator attached to and acting between each side member and said cross member, each of said side members having an arm extending radially therefrom adjacent said bearing means attached to said cross member and engaging and journalling said side member for connection to said hydraulic actuator.

6. The vehicle of claim 1 in which said side members are tubes and said bearing means joining said tubes to said cross member and also included in said vehicular assemblies comprise journal boxes which telescopingly receive and cooperate with said tubular side members and include bearings for supporting said side members while reducing frictional resistance to rotation of said side members about their axes and for preventing axial movement of said side members with respect to said bearing means.

7. The vehicle of claim 1 in which said side members have longitudinally extending exterior cleats and each of said load engaging and supporting means comprises a hook portion associated with each side member for removable engagement with a cleat thereon at selected points along its length and for rotation with said associated side member.

8. The vehicle of claim 7 in which said load engaging and supporting means includes a radially extending arm portion associated with each of said side members together with each of said associated hook portions, each of said arm portions thereby associated with one of said side members directed generally toward the other of said side members and movable upon rotation of said associated side members to and between generally upwardly and downwardly inclined directions.

9. The vehicle of claim 8 in which said supporting means extending between and connected to said arm portions comprises a U-shaped stirrup having an arcuately curved footpiece and pivotally connected to and hanging downwardly from each of a pair of laterally opposite ones of said radially extending arm portions and a crossbeam extending longitudinally from one side member across to the other side member and through and supported by said stirrups in tangential contact with said footpieces whereby said crossbeam is raised and lowered upon counterrotation of said side members in one direction and the other, respectively.

References Cited

UNITED STATES PATENTS 2,750,197   6/1956   Tripp _____ 214—396

FOREIGN PATENTS 686,321   1/1953   Great Britain.

GERALD M. FORLENZA, *Primary Examiner.*

ALBERT J. MAKAY, *Assistant Examiner.*